(12) United States Patent
Renggli

(10) Patent No.: US 12,076,786 B2
(45) Date of Patent: Sep. 3, 2024

(54) DEVICE FOR MANIPULATING PREFERABLY A CASTING TUBE IN A CHANGING DEVICE AT THE SPOUT OF A METALLURGICAL VESSEL

(71) Applicant: Refractory Intellectual Property GmbH &Co. KG, Vienna (AT)

(72) Inventor: Raphael Renggli, Rotkreuz (CH)

(73) Assignee: Refractory Intellectual Property GmbH & Co. KG, Vienna (AT)

( * ) Notice: Subject to any disclaimer, the term of this patent is extended or adjusted under 35 U.S.C. 154(b) by 427 days.

(21) Appl. No.: 17/597,248

(22) PCT Filed: Jun. 26, 2020

(86) PCT No.: PCT/EP2020/068094
§ 371 (c)(1),
(2) Date: Dec. 30, 2021

(87) PCT Pub. No.: WO2021/001279
PCT Pub. Date: Jan. 7, 2021

(65) Prior Publication Data
US 2022/0314311 A1    Oct. 6, 2022

(30) Foreign Application Priority Data
Jul. 3, 2019 (EP) .................................... 19184212

(51) Int. Cl.
*B22D 41/56* (2006.01)
*B25J 11/00* (2006.01)

(52) U.S. Cl.
CPC ............... *B22D 41/56* (2013.01); *B25J 11/00* (2013.01)

(58) Field of Classification Search
CPC ....................................................... B22D 41/56
See application file for complete search history.

(56) References Cited

U.S. PATENT DOCUMENTS

| 3,665,148 A | 5/1972 | Yasenchak et al. |
| 3,760,956 A | 9/1973 | Burch |

(Continued)

FOREIGN PATENT DOCUMENTS

| DE | 102009051149 A | 8/2010 |
| JP | 0327854 A | 2/1991 |

(Continued)

*Primary Examiner* — Kevin E Yoon
(74) *Attorney, Agent, or Firm* — Brian Roffe

(57) ABSTRACT

In a device for manipulating preferably a casting tube in a changing device at the spout of a metallurgical vessel, this manipulation is performed by means of a robot having an attachable base, a carrying arm that pivots on the base and at least one extension arm mounted rotatably on the carrying arm and has a gripper, preferably for the casting tube. The base of the robot is attached alongside the vessel such that the carrying arm is pivotable to a side of the vessel into a downwardly directed position and each extension arm is movable along an underside of the vessel. This provides optimum placement of the robot, and consequently the device, so they do not impede access for personnel to the tundish on the casting platform during casting and corresponding manipulations can be carried out easily and operationally reliably with the device in an automated manner.

9 Claims, 2 Drawing Sheets

(56) References Cited

U.S. PATENT DOCUMENTS

Figure 1:
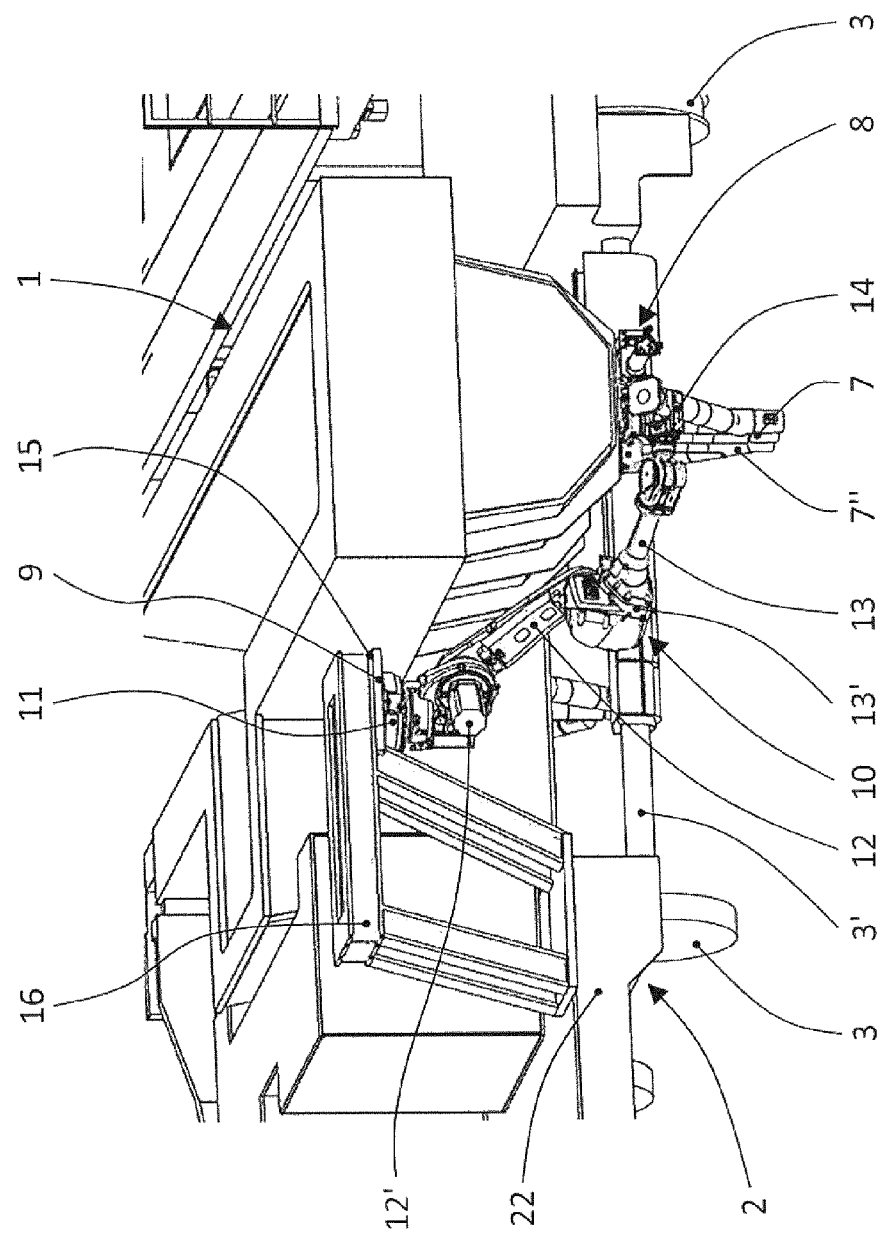

| | | | |
|---|---|---|---|
| 3,802,407 | A | 4/1974 | Imazu |
| 4,470,446 | A | 9/1984 | Kamikawa et al. |
| 4,571,149 | A | 2/1986 | Soroka et al. |
| 7,134,481 | B2 | 11/2006 | Osada et al. |
| 8,498,740 | B2 | 7/2013 | Truttman |
| 8,795,583 | B2 | 8/2014 | Heller et al. |
| 9,314,841 | B2 | 4/2016 | Steiner et al. |
| 9,757,798 | B2 | 9/2017 | Gisler et al. |
| 10,799,949 | B2 | 10/2020 | Vukovic et al. |
| 10,857,593 | B2 | 12/2020 | Renggli et al. |
| 2006/0196628 | A1 | 9/2006 | Osada et al. |
| 2008/0058981 | A1 | 3/2008 | Andretsch et al. |

FOREIGN PATENT DOCUMENTS

| | | | | |
|---|---|---|---|---|
| WO | 2005118182 A1 | 12/2005 | | |
| WO | WO-2007057061 A1 * | 5/2007 | ........... | B22D 11/111 |
| WO | 2021001279 A1 | 1/2021 | | |

\* cited by examiner

DEVICE FOR MANIPULATING PREFERABLY A CASTING TUBE IN A CHANGING DEVICE AT THE SPOUT OF A METALLURGICAL VESSEL

The invention relates to a device for manipulating preferably a casting tube in a changing device at the spout of a metallurgical vessel, wherein this manipulation is performed by means of a robot, which comprises an attachable base, a carrying arm that can pivot on the base, and at least one extension arm that is mounted rotatably on the carrying arm, with a gripper, preferably for the casting tube.

A device according to the printed publication EP-A-2 056 983 serves to maintain a sliding gate mounted at the spout of a container for metal melts. This system is provided with at least one mould magazine and with means for opening and closing the sliding gate. A robot is provided, which is equipped with an automatic gripper changing system and is operationally connected to a control device, and by means of which the exact position of the container and the sliding gate respectively can be automatically determined. Following this it can actuate the sliding gate and open and close it, and, depending on the state of the individual components which are to be replaced, it grips tools or spare parts from the magazines surrounding it, and carries out cleaning work, component structure, and their replacement or reinstallation. This robot is of robust design, and installed at a ladle location remote from the casting platform.

The invention is based on the object of providing a device of the type referred to in the preamble, by means of which a change of casting tube and/or other manipulations can be carried out in an automated manner on the casting platform of an installation, in particular during the casting, and the robot used is optimally placed in this situation.

This object is solved according to the invention in accordance with the features of claim 1.

With this arrangement of the robot according to the invention, with such a securing arrangement of the base next to the container, such that its carrying arm can be pivoted laterally at the container into a position directed downwards, and the at least one extension arm mounted on it can be moved along the under side of the container, optimum placement of the robot can be achieved, and therefore of the device, such that this does not impede access for personnel to the tundish on the casting platform during casting, and the corresponding manipulations can be carried out with the device, such as a casting tube change, in an automated manner and very easily and operationally safely and reliably. In addition, with the arrangement of the device as provided for, a region can be produced on the casting platform which is protected for the personnel.

These advantages are basically provided when the robot is mounted on a fixed-installed tundish, or, advantageously on a carriage or car which can be moved towards the tundish.

For the mounting and removal of the robot on the tundish car, and to adjust its position to the structural design features of the tundish, it is particularly advantageous for the base of the robot to be located on the under side of a linkage or the like on the rear side of the tundish car. This allows for the robot to be mounted in the optimum installation position without changing the overall structure of the tundish car.

This is particularly advantageous with tundishes with two or more spouts and if one robot is used per spout.

The device according to the invention is well-suited for a casting tube change when a critical degree of wear has been reached of the respective refractory casting tube presently in use, and with a known change device. For this purpose, the robot is provided with a control device for its manipulation movements, by means of which the removal of the preheated new casting tube from a preheating station can be carried out, the alignment and insertion of the tube into the changing device, and the removal from there of the old casting tube, in an automated manner.

The robot according to the invention can preferably also be used for additional or alternative manipulations than casting tube changes, on the casting platform with metallurgical containers.

Figure 2:
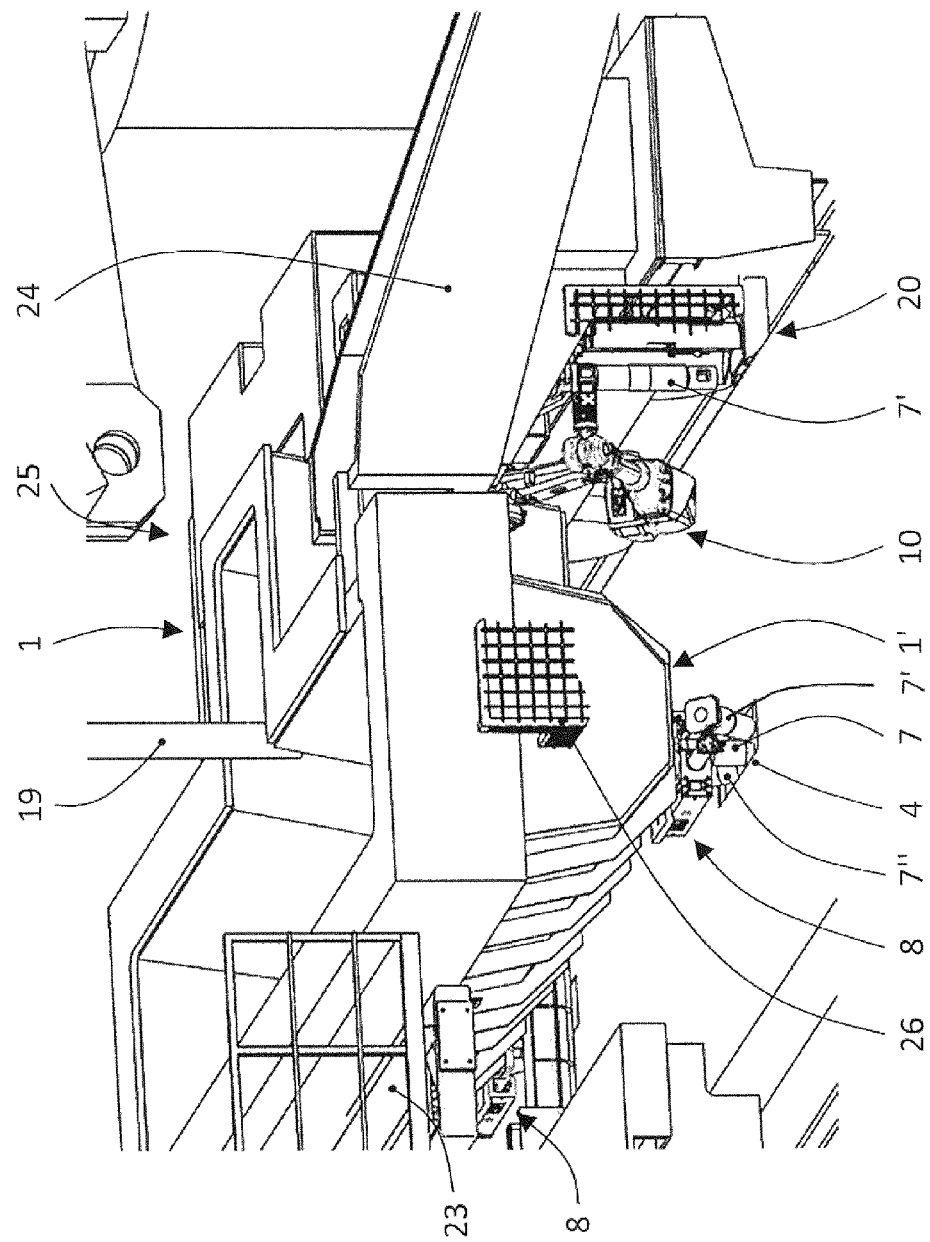

The invention is explained in greater detail hereinafter on the basis of exemplary embodiments and making reference to the Figures. The Figures show:

FIG. 1 is a tundish in a perspective representation, presented as a container, with a device according to the invention for the manipulating of a casting tube with a changing device; and FIG. 2 is in a perspective view, the tundish and the device according to FIG. 1 at the removal of a casting tube from a preheating station.

FIG. 1 and FIG. 2 show a tundish 1 as a metallurgical container, which is used in a continuous casting plant for the continuous delivery of the steel melts into moulds 4 of casting strands. The liquid steel is conveyed from a ladle, not represented, above this tundish 1, through a refractory shadow tube 19, and fills the tundish.

In principle, however, this can relate to a container other than a tundish, such as a ladle or another such object in the non-ferrous metal range, with which manipulations can be carried out with casting or with gas flushing devices.

The tundish 1 is mounted on a movable car 2, and can be moved by this into the casting position above the moulds 4, or away from this casting position. This car 2 comprises essentially a car base 22, a stage 23, a discharge line 24, and wheels 3 running on rails, with wheel axes 3'. This therefore allows the front side with the stage 23 to be used for the access of personnel during the casting, and a rear side 25 of the tundish 1 is also available, where a rotating tower for the ladle is usually located.

Mounted at the two spouts, arranged at a distance from one another on the under side 1' of the tundish 1 is in each case a known changing device 8, which in each case accommodates a refractory casting tube 7, which is immersed into a mould 4 and allows for the melts to be conveyed from the tundish into this mould in an airtight manner. With this changing device 8, the casting tube is held in the casting state, and, in addition, a used casting tube 7" is replaced by a new casting tube 7'. For better explanation, in each case these three casting tubes are shown when being changed, and in FIG. 1, in addition, the newly introduced casting tube 7' is shown in the position at the immersion into the mould. In this respect, reference is made to the printed publication EP 2 663 413 B1, in which such a changing device is explained in detail.

In addition to this, a device is provided with a robot 10 for manipulating the casting tubes 7, 7', 7" at the changing device 8. This robot 10 is composed of a base 9, a carrying arm 12 which can pivot on this base, and an extension arm 13 rotatably mounted on the carrying arm 13, with a gripper 14 for the casting tube 7. In addition to this, at the base 9 is a rotatable bearing 11, which can rotate about the vertical axis, and is arranged at this pivotable carrying arm 12. This makes it possible for this robot 10 to move about six axes, namely in the x-, y-, z-directions plus three additional directions of rotation.

The equipment of the robot 10 further includes mechanical, hydraulic, and/or electrical drive elements 12', 13' for the pivoting and rotating of its moving components, as well as positioning sensors, which are connected to a control unit. By means of a control arrangement operating in a known manner, the robot can be operated in an automated manner, and the corresponding manipulation sequences can be carried out program-controlled, wherein, primarily, in an automated manner, the removal of a new preheated casting tube 7' from a preheating station 20 can be carried out, then the alignment and insertion of this into the changing device 8, and the removal of the old casting tube 7".

According to the invention, the base 9 of the robot 10 is secured next to the tundish 1 in such a way that the carrying arm 12 can be pivoted into a position directed downwards, and the at least one extension arm 13 mounted on it can be moved along the under side 1' of the tundish 1.

Accordingly, the robot 10, which is commercially available as a finished unit, can be mounted in a very simple manner upside down next to the tundish 1, and the desired manipulations can be carried out precisely by this optimum placement.

In this situation, the base 9 of the robot 10 is secured on the car 2 laterally next to the tundish 1, in the upper region, and the robot can therefore be moved together with the car. To the purpose, the car 2 comprises a bar 16, with which a contact surface 15, accessible from beneath, is formed for the securing of the base 9 of the robot 10, wherein this linkage 16, and therefore the robot 10, are arranged on the rear side 25 of the tundish 1. The linkage 16 consists in this situation of a stable profile structure or the like. This contact surface 15 is positioned somewhat underneath the upper side of the tundish 1, wherein this is oriented such as to concur with the dimensions of the tundish or the length of the carrying arm 12.

Due to there being two spouts spaced apart from one another on the under side 1' of the tundish 1, both of them are equipped with a changing device 8 and a robot 10 each, wherein the two robots are secured on the car on the top of the rear side 25, next to the tundish, at the spouts. In principle it would also be possible for a robot to be provided for both changing devices 8, which would accordingly have to be guided so as to be movable from one to the other.

The preheating station 20 referred to, for the casting tubes 7', is arranged on the rear side 25 of the tundish 1 in such a way that, by means of the robot 10, a respective preheated casting tube 7' can be removed from this preheating station 20, and can be brought to the changing device 8. In this situation, this preheating station 20 is configured in a known manner, and is therefore not described in any greater detail. The casting tubes are arranged in this preheating station in such a way that the gripper 14 can withdraw a respective casting tube 7' directly in each case.

In addition, due to its arrangement on the rear side 25 of the tundish 1, the robot 10 is also very well protected, and, with a lateral screening grille 26 as indicated, the possibility can be prevented that the personnel can come into the working zone of the robot when it is in the operational state.

In addition to this, the robot 10 is characterized in that it can be used for additional or alternative manipulations other than changing the casting tube. For example, it can be used for delivering casting powder or the like into the mould 4 from a magazine located in proximity.

The robot 10 according to the invention is also well-suited for the manipulating of other comparable components subject to wear with containers of the system, such as, for example, a refractory sink in a ladle base, or a refractory shadow tube at the spout of a sliding gate on the ladle above the tundish.

The invention is adequately represented by way of the foregoing exemplary embodiment. Further variants could also be configured, however. For example, the robot could also be equipped as a simple manipulation device. In addition, the container containing the metal melts might not be movable on the car 2, but instead, in particular, could be transported, without or with the robot 10, by means of a crane or the like.

In principle, the base 9, and the rotary bearing 11 which can be rotated with it about an axis, can be arranged with its axis not perpendicular downwards, but are aligned at an angle obliquely downwards or approximately horizontal, such that the carrying arm 12, jointed at the rotary bearing, can be pivoted at least approximately perpendicularly downwards, and makes it possible for the extension arm 13 to be movable on the carrying arm 12 beneath the tundish.

Likewise, the base of the robot might not be fixed on a separate linkage, but in some other manner to the car or another location.

Instead of a changing device for casting tubes, it would be possible, in a known manner, for a changing device for refractory free-running nozzles to be provided, wherein the free-running nozzles would likewise be placed or replaced accordingly by the robot 10.

The robot can of course be configured differently, depending on the configuration and requirements of the casting plant. It could consist more simply of only one base, one carrying arm, pivoting at this base about only one plane, and the extension arm with the gripper. It could also be possible, however, for two carrying arms or extension arms respectively to be provided.

The gripper can also be configured differently, depending on its application. It can be configured, for example, with gripping fingers or as carrying means or the like.

The invention claimed is:

1. Device for manipulating a casting tube in a changing device at a spout of a metallurgical vessel, comprising:
 a robot that performs the manipulation and which comprises an attachable base, a carrying arm that pivots on the base, and at least one extension arm mounted rotatably on the carrying arm,
 a gripper for the casting tube,
 wherein the base of the robot is secured next to a container configured as a tundish such that the carrying arm is pivotable laterally at the tundish into a position directed downwards, and the at least one extension arm mounted on the carrying arm is movable along an underside of the tundish, and
 a car on which the tundish is movable into or away from a casting position, and
 wherein the base of the robot is secured on the car laterally in an upper region next to the tundish, and therefore the robot is movable together with the car.

2. Device according to claim 1, wherein the tundish is provided with at least two spouts arranged at a distance from one another, each with a changing device and each with a robot.

3. Device according to claim 1, wherein the car comprises a linkage, wherein a contact surface accessible from beneath is formed for securing the base of the robot, wherein the linkage and therefore the robot, is arranged on a rear side of the tundish.

4. Device according to claim 1, further comprising a rotary bearing arranged at the base and which is rotatable about a vertical axis, with the carrying arm being pivotable at the rotary bearing.

5. Device according to claim 1, wherein the robot is provided with a control device for its manipulation movements, by means of which removal of a preheated new casting tube from a preheating station is carried out, as well as alignment and insertion of the preheated new casting tube into the changing device, and removal of an old casting tube, in an automated manner.

6. Device according to claim 5, wherein the preheating station for the casting tubes is arranged at the tundish on a rear side such that, by means of the robot, a respective casting tube is removable from the preheating station and brought to the changing device.

7. Device according to claim 1, wherein the robot is used for additional or alternative manipulations than changing of casting tubes on a casting platform with metallurgical containers.

8. Device according to claim 7, wherein the robot is used for a removal of casting powder from a magazine, and conveying the casting powder into a mould with the casting tube immersed in it, during casting.

9. Device according to claim 7, wherein the robot is used for replacing a refractory sink in a base of another container.

\* \* \* \* \*

UNITED STATES PATENT AND TRADEMARK OFFICE
CERTIFICATE OF CORRECTION

| | |
|---|---|
| PATENT NO. | : 12,076,786 B2 |
| APPLICATION NO. | : 17/597248 |
| DATED | : September 3, 2024 |
| INVENTOR(S) | : Raphael Renggli |

It is certified that error appears in the above-identified patent and that said Letters Patent is hereby corrected as shown below:

In the Claims

Claim 8:
Column 5, Line 18, before "removal", delete "a".

Signed and Sealed this
First Day of October, 2024

Katherine Kelly Vidal
Director of the United States Patent and Trademark Office